(12) United States Patent
Yoshida et al.

(10) Patent No.: US 10,099,721 B2
(45) Date of Patent: Oct. 16, 2018

(54) ELECTRIC POWER STEERING APPARATUS

(71) Applicant: NSK LTD., Tokyo (JP)

(72) Inventors: Keita Yoshida, Maebashi (JP); Yousuke Imamura, Maebashi (JP); Masahiro Maeda, Maebashi (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 15/127,232

(22) PCT Filed: Nov. 5, 2015

(86) PCT No.: PCT/JP2015/081160
§ 371 (c)(1),
(2) Date: Sep. 19, 2016

(87) PCT Pub. No.: WO2016/080198
PCT Pub. Date: May 26, 2016

(65) Prior Publication Data
US 2018/0170422 A1 Jun. 21, 2018

(30) Foreign Application Priority Data

Nov. 19, 2014 (JP) ................................. 2014-234638
Mar. 4, 2015 (JP) ................................. 2015-042024
Apr. 9, 2015 (JP) ................................. 2015-079873

(51) Int. Cl.
*B62D 5/04* (2006.01)
*B62D 6/10* (2006.01)
*B62D 6/00* (2006.01)

(52) U.S. Cl.
CPC ......... *B62D 5/0472* (2013.01); *B62D 5/0463* (2013.01); *B62D 6/008* (2013.01);
(Continued)

(58) Field of Classification Search
CPC .... B62D 5/0472; B62D 5/0463; B62D 6/008; B62D 6/10; B62D 5/046; B62D 5/04
See application file for complete search history.

(56) References Cited

U.S. PATENT DOCUMENTS 9,821,837 B2 * 11/2017 Kitazume ................ B62D 6/00
9,981,683 B2 * 5/2018 Lee ....................... B62D 5/0466
(Continued)

FOREIGN PATENT DOCUMENTS

JP       2006-199219 A      8/2006
WO      2012/160850 A1      11/2012

OTHER PUBLICATIONS

International Search Report of PCT/JP2015/081160 dated Jan. 26, 2016.

*Primary Examiner* — Anne Marie M Boehler
*Assistant Examiner* — Marlon A Arce
(74) *Attorney, Agent, or Firm* — Sughrue Mion, PLLC

(57) ABSTRACT

An electric power steering apparatus that reduces an uncomfortable feeling due to a noise at a steering holding and a low-speed steering time, and can smoothly steers so as to prevent a phase-lag at a high-speed steering time. The apparatus has a torque control section to calculate a current command value based on at least a steering torque, and assist-controls a steering system by driving a motor using a current control system based on the current command value. A motor angular velocity calculating section calculates a motor angular velocity from a motor rotational angle; a motor angular acceleration calculating section calculates a motor angular acceleration from the motor angular velocity; and a stability compensating section calculates a steering torque for compensation and a current command value for compensation based on the motor angular velocity and the motor angular acceleration. The steering torque compen- (Continued)

sates the steering torque, and the current command value compensates the current command value.

15 Claims, 14 Drawing Sheets

(52) U.S. Cl.
CPC .................. *B62D 6/10* (2013.01); *B62D 5/04* (2013.01); *B62D 5/046* (2013.01)

(56) References Cited

U.S. PATENT DOCUMENTS

| | | | |
|---|---|---|---|
| 2009/0192679 A1* | 7/2009 | Kobayashi | B62D 5/0463 701/42 |
| 2014/0058630 A1* | 2/2014 | Kezobo | B62D 5/0472 701/42 |

* cited by examiner

PRIOR ART

ELECTRIC POWER STEERING APPARATUS

CROSS REFERENCE TO RELATED APPLICATIONS

This application is a National Stage of International Application No. PCT/JP2015/081160 filed Nov. 5, 2015, claiming priority based on Japanese Patent Application Nos. 2014-234638, filed Nov. 19, 2014, 2015-042024, filed Mar. 4, 2015, and 2015-079873, filed Apr. 9, 2015, the contents of which are incorporated herein by reference in their entirety.

TECHNICAL FIELD

The present invention relates to an electric power steering apparatus that provides an assist torque by using a motor to a steering system of a vehicle, and in particular to a high-performance electric power steering apparatus that lessens micro-vibration and improves a steering feeling by varying a cut-off frequency of a filtering section depending on a motor angular velocity or the motor angular velocity and a vehicle speed, in order to reduce an uncomfortable feeling due to a noise at a low-speed steering time and smoothly steer so as to prevent a phase-lag at a high-speed steering time.

BACKGROUND ART

An electric power steering apparatus (EPS) that gives an assist torque (assist force) with a rotary power force of a motor to a steering system of a vehicle gives a driving force of the motor as an assist to a steering shaft or a rack shaft by means of a transmission mechanism such as gears or a belt through a reduction mechanism. In order to accurately generate an assist torque (steering assist torque), such a conventional electric power steering apparatus performs a feedback control of a motor current. The feedback control adjusts a voltage supplied to the motor so that a difference between a current command value and a detected motor current value becomes small, and the adjustment of the voltage supplied to the motor is generally performed by an adjustment of a duty ratio of a PWM (Pulse Width Modulation) control.

A general configuration of the conventional electric power steering apparatus will be described with reference to FIG. 1. A column shaft (a steering shaft or a steering wheel shaft) 2 connected to a steering wheel 1 is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting the steering torque of the steering wheel 1, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist command based on the steering torque Th detected by the torque sensor 10 and a vehicle speed Vel detected by a vehicle speed sensor 12, and controls a current supplied to the motor 20 based on a voltage control value Vref obtained by performing compensation and so on with respect to the calculated current command value. A steering angle sensor 14 is not absolutely necessary, does not need to be disposed, and further a steering angle can be obtained through a rotational angle sensor such as a resolver or the like connected to the motor 20.

A controller area network (CAN) 40 to send/receive various information and signals on the vehicle is connected to the control unit 30, and it is also possible to receive the vehicle speed Vel from the CAN 40. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a CPU (including an MPU and an MCU), and general functions performed by programs within the CPU are shown in FIG. 2.

Functions and operations of the control unit 30 will be described with reference to FIG. 2. As shown in FIG. 2, the steering torque Th detected by the torque sensor 10 and the vehicle speed Vel detected by the vehicle speed sensor 12 are inputted into a torque control section 31 that calculates a current command value by using an assist map and so on and performs compensation and so on with respect to the calculated current command value. A current command value Iref1 calculated in the torque control section 31 is limited a maximum value in a current limiting section 33. A current command value Irefm limited the maximum value is inputted into a subtracting section 32B which is subtracted a motor current detected value Im.

A deviation I (=Irefm−Im) that is the subtracted output of the subtracting section 32B is inputted into a current control section 35 that performs PI (proportional and integral) controls and so on, and a current-controlled voltage control value Vref is inputted into a PWM control section 36 which calculates a duty ratio in synchronous with a carrier signal CF. A motor 20 is PWM-driven through an inverter 37 as a driving section. The motor current detected value Im of the motor 20 is detected by a motor current detector 38, and is fed back to the subtracting section 32B.

A rotational angle sensor 21 such as a resolver is connected to a motor 20, a motor angle θ is outputted from the rotational angle sensor 21.

In such an electric power steering apparatus, in a condition of a steering holding and a low-speed steering, the electric power steering apparatus generates a micro vibration, by which a driver might feel an uncomfortable feeling. As one of the causes, a high frequency noise of a motor angular acceleration signal could be found.

An electric power steering apparatus that is easily tuned up and is intended to suppress a brake-judder and a shimmy and provides safe and comfortable steering performances by performing a signaling process of a road-surface and an external disturbance and so on in a range of high frequencies as a compensator utilized the motor angular acceleration for such a high frequency noise, is proposed in Japanese Patent No. 4715212 (Patent Document 1).

The electric power steering apparatus disclosed in Patent Document 1 has an SAT feedback section that estimates an SAT (Self Aligning Torque) by inputting a motor rotational angular velocity, a motor angular acceleration, a steering assist force and a steering signal. Then, the obtained SAT value is added to a steering assist command value through a transfer function section including a high pass filter (HPF) and a gain section, and the characteristics of the HPF and the gain section vary in sensitive to the vehicle speed signal.

THE LIST OF PRIOR ART DOCUMENTS

Patent Documents

Patent Document 1: Japanese Patent No. 4715212

SUMMARY OF THE INVENTION

Problems to be Solved by the Invention

The apparatus disclosed in Patent Document 1 varies a cut-off frequency depending on the vehicle speed, and a type of a filter is a high pass filter. The object of the HPF is to mainly suppress the brake-judder and the shimmy, and to improve a property of a responsibility of the high frequency side. Therefore, it is considered that there is no effect for the micro vibrations due to the high frequency noises of the angular acceleration at the steering holding time and the low-speed steering time. Moreover, if the noises are removed in a lump by applying a filter for the motor angular acceleration signal, a lag (a deviation due to the phase-lag becomes large) is generated in a high-speed steering and a performance of the compensator becomes down. Therefore, it assumed that the feeling of the steering deteriorates.

The present invention has been developed in view of the above-described circumstances, and an object of the present invention is to provide an electric power steering apparatus that reduces an uncomfortable feeling due to a noise at a steering holding and a low-speed steering time and can steer smoothly so as to prevent a phase-lag at a high-speed steering time.

Means for Solving the Problems

The present invention relates to an electric power steering apparatus that has a torque control section to calculate a current command value based on at least a steering torque, and assist-controls a steering system by driving a motor by means of a current control system based on the current command value, comprising: a motor angular velocity calculating section to calculate a motor angular velocity $\omega$ from a motor rotational angle, a motor angular acceleration calculating section to calculate a motor angular acceleration $\alpha$ from the motor angular velocity $\omega$, and a stability compensating section to calculate a steering torque for compensation and a current command value for compensation based on the motor angular velocity $\omega$ and the motor angular acceleration $\alpha$, wherein the steering torque for compensation compensates the steering torque, and the current command value for compensation compensates the current command value.

Further, the above-described object of the present invention is more effectively achieved by that: wherein the stability compensating section comprises a first cut-off frequency varying section to set a cut-off frequency fc1 based on the motor angular velocity $\omega$, a first filtering section to filtering-process the motor angular acceleration $\alpha$ depending on the cut-off frequency fc1, a second cut-off frequency varying section to set a cut-off frequency fc2 based on the motor angular velocity $\omega$, and a second filtering section to filtering-process the motor angular acceleration $\alpha$ depending on the cut-off frequency fc2;

or wherein the first cut-off frequency varying section has a cut-off frequency characteristic by which the first cut-off frequency fc1 keeps a constant in a range equal to or less than a motor angular velocity $\omega 1$, and linearly or nonlinearly increases in a range more than the motor angular velocity $\omega 1$, and the second cut-off frequency varying section a cut-off frequency characteristic by which the second cut-off frequency fc2 keeps a constant in a range equal to or less than a motor angular velocity $\omega 2$ ($>\omega 1$), and linearly or nonlinearly increases in a range more than the motor angular velocity $\omega 2$;

or wherein the first cut-off frequency varying section has a cut-off frequency characteristic, by which the first cut-off frequency fc1 linearly increases in a range equal to or less than a motor angular velocity $\omega 10$, and linearly or nonlinearly becomes high in a range more than the motor angular velocity $\omega 10$, and the second cut-off frequency varying section has a cut-off frequency characteristic, by which the second cut-off frequency fc2 linearly increases in a range equal to or less than a motor angular velocity $\omega 11$ ($>\omega 10$), and linearly or nonlinearly becomes high in a range more than the motor angular velocity $\omega 11$;

or wherein a vehicle speed Vel is further used for calculations of the steering torque for compensation and the current command value for compensation, and the motor angular velocity $\omega$ and the vehicle speed Vel are respectively used for settings of the cut-off frequency fc1 and the cut-off frequency fc2;

or wherein the first cut-off frequency varying section calculates and obtains the cut-off frequency fc1, which is calculated with an arithmetical mean of a frequency fc11 which is calculated by means of an angular velocity-related map that indicates a relation between the motor angular velocity $\omega$ and a frequency and a frequency fcv11 which is calculated by means of a vehicle speed-related map that indicates a relation between the vehicle speed Vel and a frequency, and the second cut-off frequency varying section calculates and obtains the cut-off frequency fc2, which is calculated with an arithmetical mean of a frequency fc21 which is calculated by means of an angular velocity-related map that indicates a relation between the motor angular velocity $\omega$ and a frequency and a frequency fcv21 which is calculated by means of a vehicle speed-related map that indicates a relation between the vehicle speed Vel and a frequency;

or wherein the angular velocity-related map of the first cut-off frequency varying section has a characteristic by which the first cut-off frequency fc1 keeps a constant in a range equal to or less than a motor angular velocity $\omega 21$, and linearly or nonlinearly becomes high in a range more than the motor angular velocity $\omega 21$, and the angular velocity-related map of the second cut-off frequency varying section has a characteristic by which the second cut-off frequency fc21 keeps a constant in a range equal to or less than a motor angular velocity $\omega 22$ ($>\omega 21$), and linearly or nonlinearly becomes high in a range more than the motor angular velocity $\omega 22$;

or wherein the angular velocity-related map of the first cut-off frequency varying section has a cut-off frequency characteristic, by which the frequency fc11 linearly increases in a range equal to or less than a motor angular velocity $\omega 21$, and linearly or nonlinearly becomes high in a range more than the motor angular velocity $\omega 21$, and the angular velocity-related map of the second cut-off frequency varying section has a cut-off frequency characteristic, by which the frequency fc21 linearly increases in a range equal to or less than a motor angular velocity $\omega 22$ ($>\omega 21$), and linearly or nonlinearly becomes high in a range more than the motor angular velocity $\omega 22$;

or wherein the vehicle speed-related map of the first cut-off frequency varying section has a frequency characteristic that keeps a constant fcv11 in a range equal to or less than a low vehicle speed Vel11 of the vehicle speed Vel, linearly or nonlinearly decreases to a frequency fcv12 (<fcv11) in a range more than the low vehicle speed Vel11 and equal to or less than a high vehicle speed Vel12, and keeps the frequency fcv12 in a ranges more than the high vehicle speed Vel12, and the vehicle speed-related map of the second cut-off frequency varying section has a characteristic that keeps a constant fcv21 in a range equal to or less than a low vehicle speed Vel21 of the vehicle speed Vel, linearly or nonlinearly decreases to a frequency fcv22 (<fcv21) in a range more than the low vehicle speed Vel21 and equal to or less than a high vehicle speed Vel22, and keeps the frequency fcv22 in a range more than the high vehicle speed Vel22;

or wherein the first cut-off frequency varying section calculates and obtains the cut-off frequency fc1, which is calculated with a weighted average of a frequency fc31 which is calculated by means of an angular velocity-related map that indicates a relation between the motor angular velocity ω and a frequency and a frequency fcv11 which is calculated by means of a vehicle speed-related map that indicates a relation between the vehicle speed Vel and a frequency, and the second cut-off frequency varying section calculates and obtains the cut-off frequency fc2, which is calculated with a weighted average of a frequency fc32 which is calculated by means of an angular velocity-related map that indicates a relation between the motor angular velocity ω and a frequency and a frequency fcv21 which is calculated by means of a vehicle speed-related map that indicates a relation between the vehicle speed Vel and a frequency;

or wherein the angular velocity-related map of the first cut-off frequency varying section has a characteristic by which the frequency fc31 keeps a constant in a range equal to or less than a motor angular frequency ω31, and linearly or nonlinearly becomes high in a range more than the motor angular velocity ω31, and the angular velocity-related map of the second cut-off frequency varying section has a characteristic by which the frequency fc32 keeps a constant in a range equal to or less than a motor angular velocity ω32 (>ω31), and linearly or nonlinearly becomes high in a range more than the motor angular velocity ω32;

or wherein the angular velocity-related map of the first cut-off frequency varying section has a cut-off frequency characteristic, by which the frequency fc31 linearly increases in a range equal to or less than the motor angular velocity ω31, and linearly or nonlinearly becomes high in a range more than the motor angular velocity ω31, and the angular velocity-related map of the second cut-off frequency varying section has a cut-off frequency characteristic, by which the frequency fc32 linearly increases in a range equal to or less than the motor angular velocity ω3 2 (>ω1), and linearly or nonlinearly becomes high in a range more than the motor angular velocity ω32;

or wherein the vehicle speed-related map of the first cut-off frequency varying section has a frequency characteristic that keeps a constant fcv31 in a range equal to or less than a low vehicle speed Vel31 of the vehicle speed Vel, and linearly or nonlinearly increases to a frequency fcv32 (>fcv31) in a range more than the low vehicle speed Vel31 and equal to or less than a high vehicle speed Vel32, and keeps the frequency fcv32 in a range more than the high vehicle speed Vel32, and the vehicle speed-related map of the second cut-off frequency varying section has a characteristic that keeps a constant fcv41 in a range equal to or less than a low vehicle speed Vel41 of the vehicle speed Vel, and linearly or nonlinearly increases to a frequency fcv42 (>fcv41) in a range more than the low vehicle speed Vel41 and equal to or less than a high vehicle speed Vel42, and keeps the frequency fcv42 in a range more than the high vehicle speed Vel42.

Effects of the Invention

According to the electric power steering apparatus of the present invention, in the stability compensating section, it is possible to suppress components of the noise of the motor angular velocity by setting a low cut-off frequency at the steering holding time and the low-speed steering time, and setting a high cut-off frequency at the high-speed steering time. Consequently, it is possible to obtain a steering feeling that the micro vibration due to the noise of the motor angular acceleration at the steering holding time and the low-speed steering time is reduced without injury of the performance of the compensator in a high frequency region.

An effective compensation value can be provided, since a filtering characteristic of the stability compensating section is separated to a compensation of the steering torque and a compensation of the current command value. In this connection, an ideal torque command value can be generated by removing a torque ripple, included in the steering torque, due to the steering mechanism having the reduction gears and to the torque sensor, and by extracting only a steering torque of a driver. On the other hand, a compensation of the current command value compensates to reduce the torque ripple occurred by electrical factors including unevenness of the motor or a cogging torque and to reduce a floor vibration. Therefore, the micro vibration become not to generate easily.

Moreover, by varying the cut-off frequency depending on the vehicle speed, both reducing the vibration and the steering feeling can be performed.

MODE FOR CARRYING OUT THE INVENTION

In an electric power steering apparatus of the present invention, a cut-off frequency of a filtering section that filtering-processes a motor angular acceleration is able to vary depending on a motor angular velocity or the motor angular velocity and a vehicle speed in order to reduce a uncomfortable feeling due to a noise at a low-speed steering time and to get a smooth steering without a phase-lag at a high-speed steering time, by a stability compensating section based on the motor angular velocity and the motor angular acceleration, or the motor angular velocity, the motor angular acceleration and the vehicle speed. That is, the electric power steering apparatus that obtains the comfortable steering feeling reduced the micro-vibration by setting the low cut-off frequency at the steering holding time or the low-speed steering time and by setting the high cut-off frequency at the high-speed steering time, is achieved.

Hereinafter, an embodiment of the present invention will be described with reference to the accompanying drawings.

Figure 1:
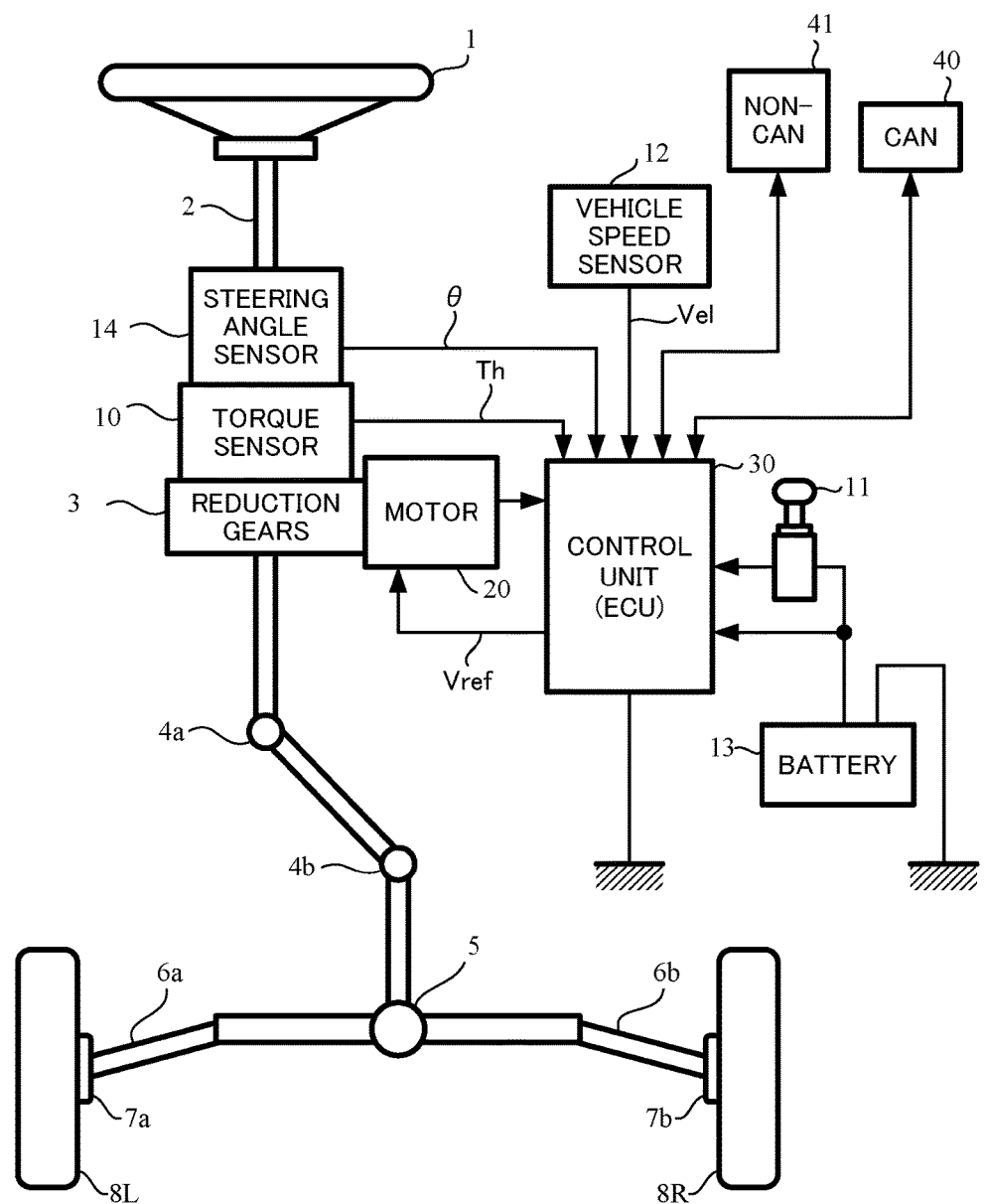
FIG. 1 is a configuration diagram illustrating a general outline of an electric power steering apparatus.
Figure 2:
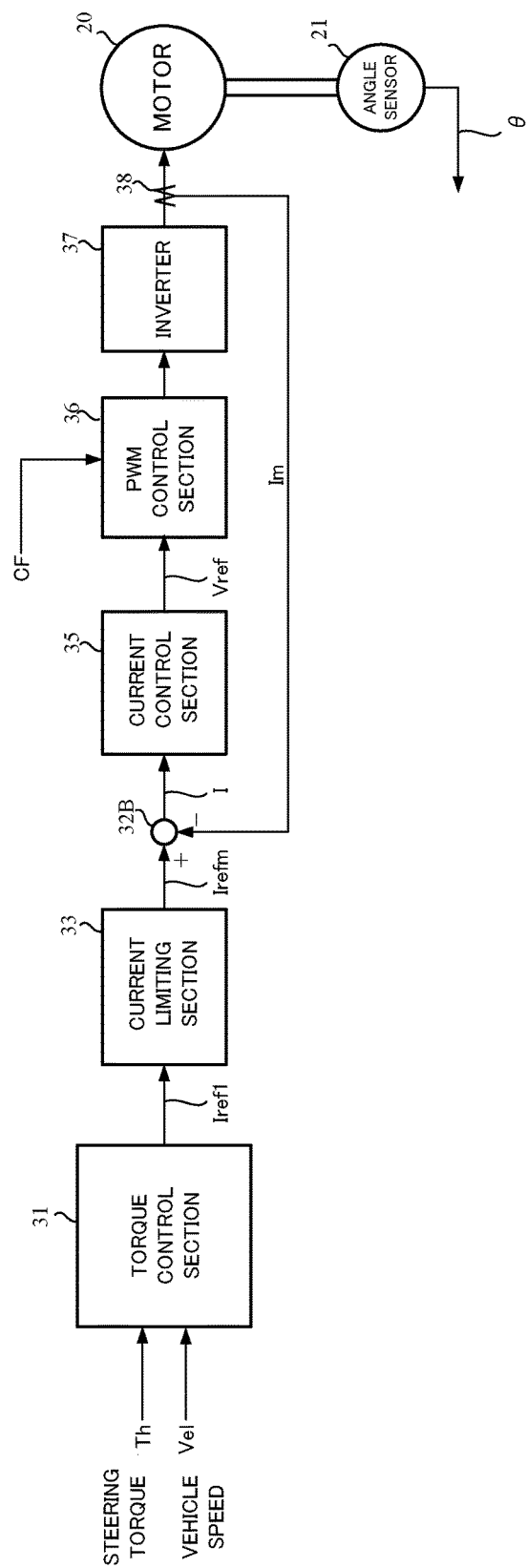
FIG. 2 is a block diagram showing a configuration example of a control system of the electric power steering apparatus.
Figure 3:
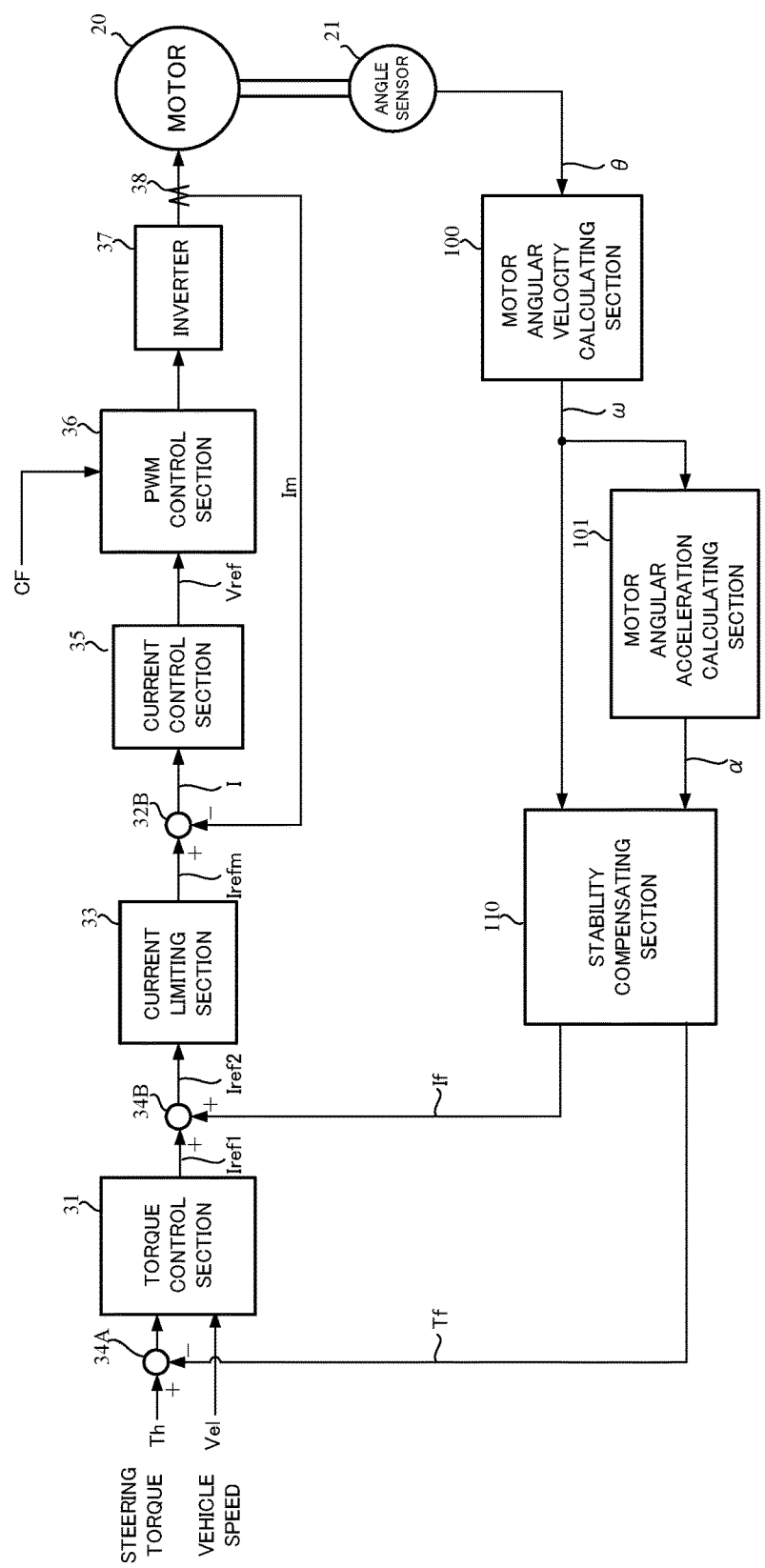
FIG. 3 is a block diagram showing a configuration example (the first embodiment) of the present invention.

FIG. 3 shows a configuration example (the first embodiment) of the present invention corresponding to FIG. 2. A motor rotational angle θ sent from a rotational angle sensor 21 connected to a motor 20 is inputted into a motor angular velocity calculating section 100, in which the motor angular velocity ω is calculated (differentiated). The motor angular velocity ω is inputted into a motor angular acceleration calculating section 101 and a stability compensating section 110, which provides a steering torque for compensation Tf and a current command value for compensation If by controlling to vary cut-off frequencies. Also, a subtracting section 34A is set on an input side of the torque control section 31, and an adding section 34B is set between the torque control section 31 and a current limiting section 33. A steering torque Th is addition-inputted into a subtracting section 34A and the steering torque for compensation Tf is subtraction-inputted into the subtracting section 34A. The adding section 34B performs an addition of the current command value Iref1 and the current command value for compensation If.

Figure 4:
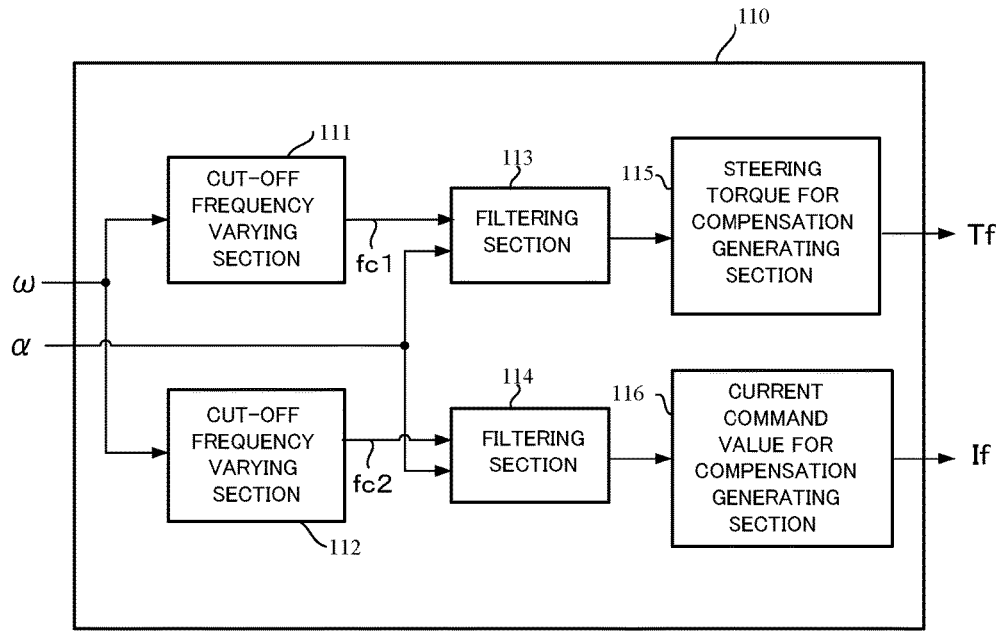
FIG. 4 is a block diagram showing a configuration example (the first embodiment) of a stability compensation section.

As shown in FIG. 4, the stability compensating section 110 comprises cut-off frequency (fc) varying sections 111 and 112 that vary cut-off frequencies fc based on the motor angular velocity ω, a filtering section 113 that filtering-processes the motor angular acceleration α based on a cut-off frequency fc1 from the cut-off frequency varying section 111, a filtering section 114 that filtering-processes the motor angular acceleration α based on the cut-off frequency fc2 from the cut-off frequency varying section 112, a steering torque for compensation generating section 115 that outputs the steering torque for compensation Tf based on an output from the filtering section 113, and a current command value for compensation generating section 116 that outputs a current command value for compensation If based on an output from the filtering section 114.

Figure 5:
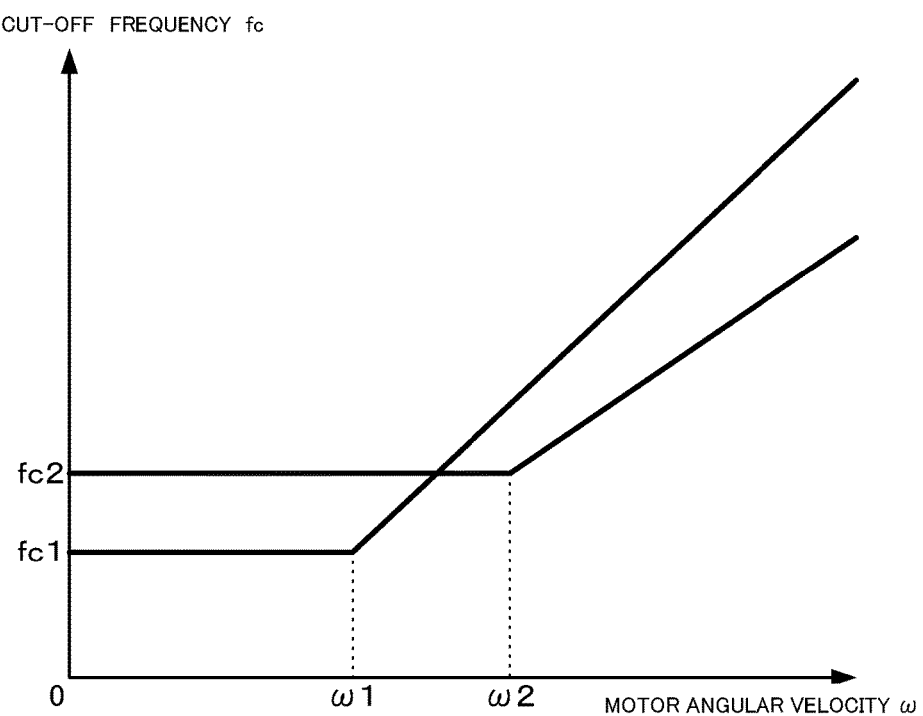
FIG. 5 is a characteristic diagram showing a characteristic example (a motor angular velocity) of a cut-off frequency of the first embodiment.

As shown in FIG. 5, for an example, the cut-off frequency varying section 111 has a characteristic by which a cut-off frequency keeps a constant fc1 in a range equal to or less than a motor angular velocity ω1, and linearly becomes high (increases) in a range more than the motor angular velocity ω1. Similarly, as shown in FIG. 5, for an example, a cut-off frequency varying section 112 has a characteristic by which the cut-off frequency keeps a constant fc2 (>fc1) in a range equal to or less than a motor angular velocity ω2 (>ω1), and linearly becomes high (increases) in a range more than the motor angular velocity ω2.

Figure 6:
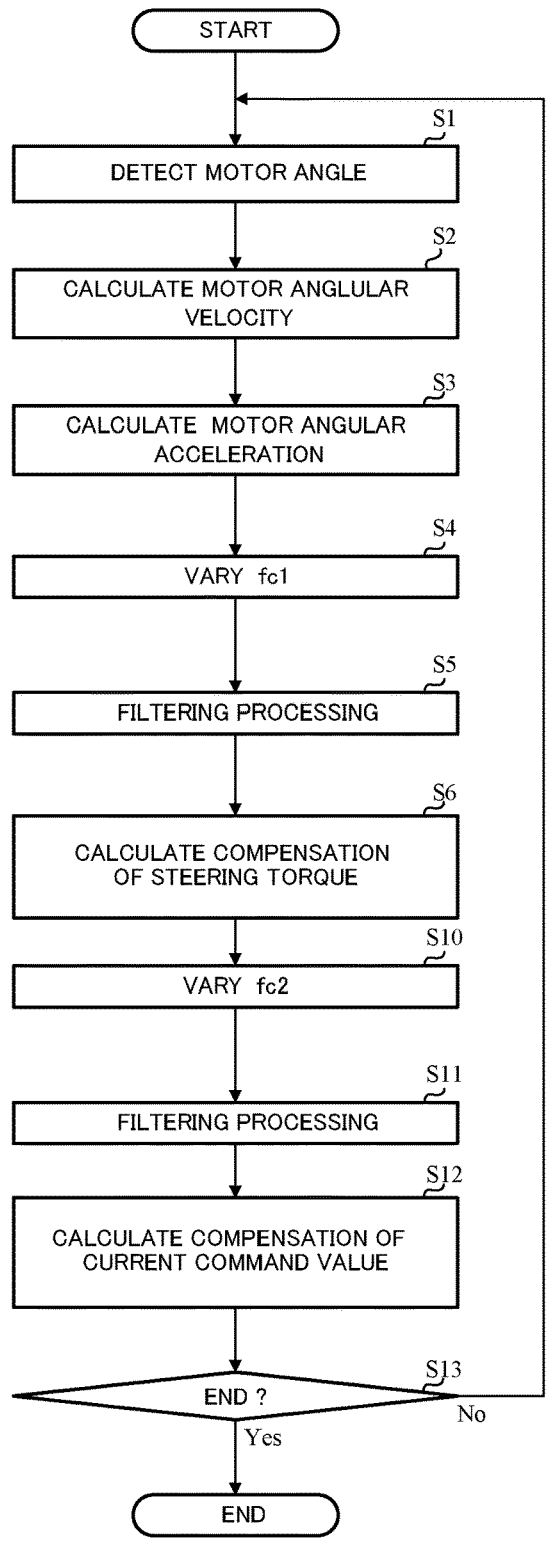
FIG. 6 is a flowchart showing an operation example (the first embodiment) of the present invention.

In such a configuration, an operation example (the first embodiment) of the present invention will be described with reference to a flowchart shown in FIG. 6.

First, the motor rotational angle θ is detected by the rotational angle sensor 21 (Step S1), the motor rotational angle θ is inputted into the motor angular velocity calculating section 100, and the motor angular velocity ω is calculated (Step S2). Then, the motor angular velocity ω is inputted into the motor angular acceleration calculating section 101 and the motor angular acceleration α is calculated (Step S3), and further is inputted into the cut-off frequency varying sections 111 and 112 within the stability compensating section 110. The motor angular acceleration α is inputted into the filtering sections 113 and 114 within the stability compensating section 110.

First, the cut-off frequency varying section 111 varies the cut-off frequency fc1 depending on the characteristic shown in FIG. 5 (Step S4). The set cut-off frequency fc1 is inputted into the filtering section 113, and the motor angular acceleration α is filtering-processed in the filtering section 113 depending on the cut-off frequency fc1 (Step S5). A signal which is filtering-processed in the filtering section 113 is inputted into the steering torque for compensation generating section 115, and the steering torque for compensation Tf which is signal-processed in the steering torque for compensation generating section 115 is inputted into the subtracting section 34A so as to compensate the steering torque Th (Step S6).

Thereafter, the cut-off frequency varying section 112 varies the cut-off frequency fc2 depending on the characteristic shown in FIG. 5 (Step S10). The set cut-off frequency fc2 is inputted into the filtering section 114, and the motor angular acceleration α is filtering-processed in the filtering section 114 depending on the cut-off frequency fc2 (Step S11). A signal which is filtering-processed in the filtering section 114 is inputted into the current command value for compensation generating section 116, and the current command value for compensation If which is signal-processed in the current command value for compensation generating section 116 is inputted into the adding section 34B so as to compensate a current command Iref (Step S12).

Till a condition of the end is satisfied, the above operations are repeated (Step S13).

In this way, the cut-off frequency fc1 in the filtering section 113 and the cut-off frequency fc2 in the filtering section 114 are varied depending on the motor angular velocity ω so as to set the low cut-off frequency at the steering holding time and the low-speed steering time and the high cut-off frequency at the high-speed steering time. Therefore, it is possible to suppress a vibration (micro vibration at the steering holding) causing a trouble at a low frequency side without deteriorating a characteristic of a high frequency side. In other words, the performance of the compensating section improves by effectively removing superimposed noises in the motor angular acceleration α.

Thus, the electric power steering apparatus having a comfortable steering feeling can be obtained.

Figure 7:
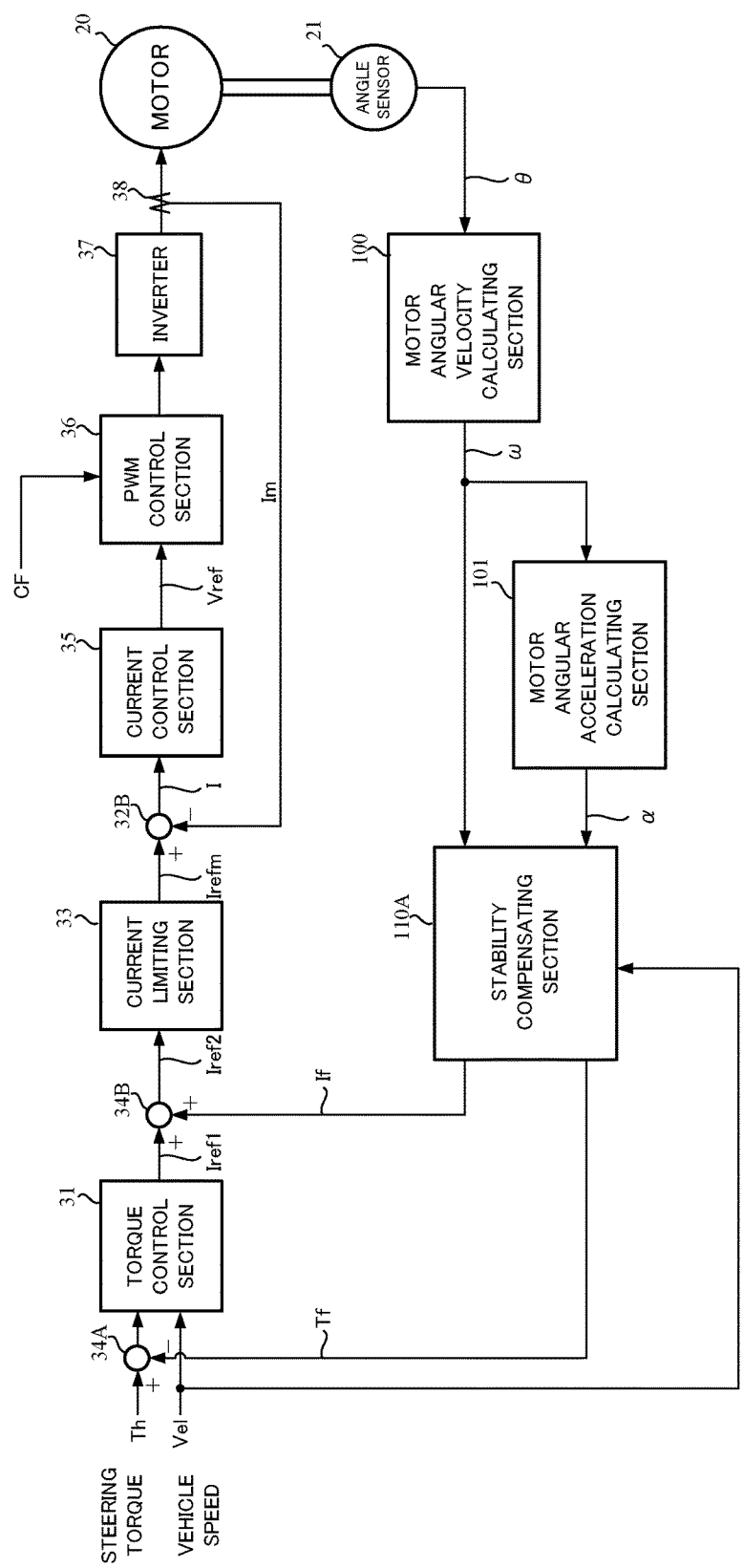
FIG. 7 is a block diagram showing a configuration example (the second embodiment) the present invention.
Figure 8:
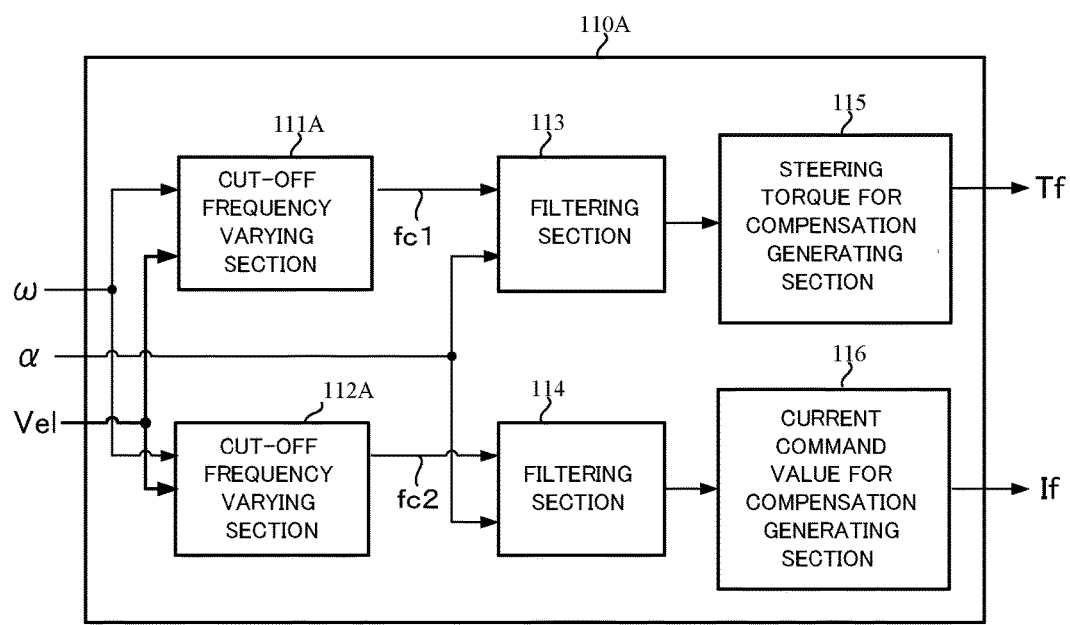
FIG. 8 is a block diagram showing a configuration example (the second embodiment) of stability compensation section.

FIG. 7 shows the second embodiment of the prevent invention corresponding to FIG. 3, and the vehicle speed Vel is further inputted into a stability compensating section 110A. As shown in FIG. 8, the stability compensating section 110A comprises cut-off frequency (fc) varying sections 111A and 112A that vary the cut-off frequencies fc based on the motor angular velocity $\omega$ and the vehicle speed Vel, the filtering section 113 that filtering-processes the motor angular acceleration $\alpha$ based on the cut-off frequency fc1 from the cut-off frequency varying section 111A, the filtering section 114 that filtering-processes the motor angular acceleration $\alpha$ based on the cut-off frequency fc2 from the cut-off frequency varying section 112A, the steering torque for compensation generating section 115 that outputs the steering torque for compensation Tf based on the output from the filtering section 113, and the current command value for compensation generating section 116 that outputs the a current command value for compensation If based on the output from the filtering section 114.

Figure 9:
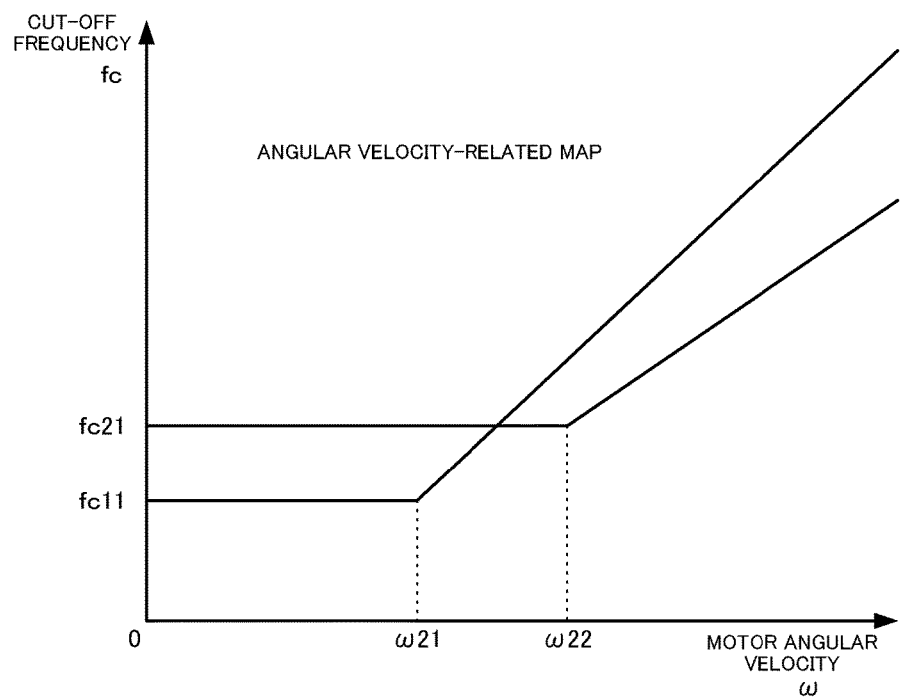
FIG. 9 is a characteristic diagram showing a characteristic example of cut-off frequency (a motor angular velocity) of the second embodiment.

As shown in FIG. 9, for an example, the cut-off frequency varying section 111A has a characteristic by which a cut-off frequency keeps a constant fc11 in a range equal to or less than a motor angular velocity $\omega21$, and linearly becomes high (increases) in a range more than the motor angular velocity $\omega21$. Similarly, as shown in FIG. 9, for an example, the cut-off frequency varying section 112A has a characteristic by which a cut-off frequency keeps a constant fc21 (>fc11) in a range equal to or less than a motor angular velocity $\omega22$ (>$\omega21$), and linearly becomes high in a range more than the motor angular velocity $\omega22$.

Figure 10:
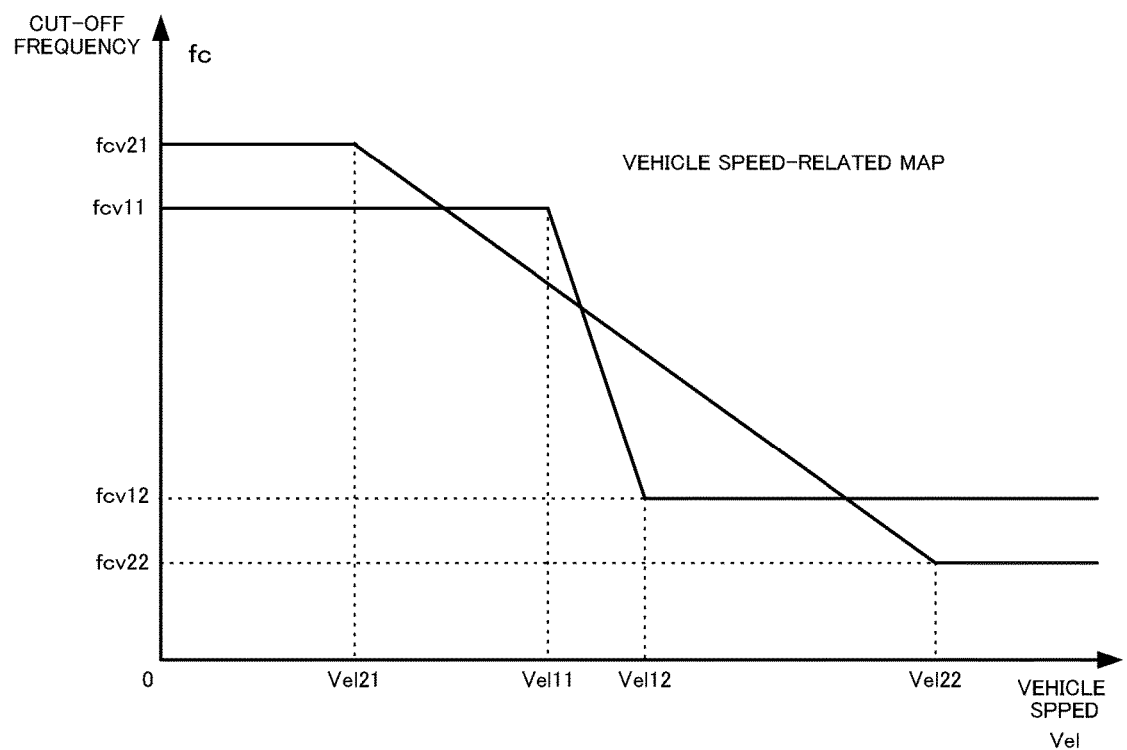
FIG. 10 is a characteristic diagram showing a characteristic example of cut-off frequency (a vehicle speed) of the second embodiment.

As shown in FIG. 10, for an example, the cut-off frequency varying section 111A has a characteristic by which a cut-off frequency keeps a constant fcv11 in a range equal to or less than a vehicle speed Vel11 of a low speed of the vehicle speed Vel, and linearly or nonlinearly decreases to a frequency fcv12 (<fcv11) in a range more than the vehicle speed Vel11 and less than a vehicle speed Vel12 of a high speed, and keeps a constant fcv12 in a range more than the vehicle speed Vel12 of the high speed. Similarly, as shown in FIG. 10, for an example, the cut-off frequency varying section 112A has a characteristic by which a cut-off frequency keeps a constant fcv21 (>fcv11) in a range equal to or less than a vehicle speed Vel21 (<Vel11) of a low speed of the vehicle speed Vel, and linearly or nonlinearly decreases to a frequency fcv22 (<fcv21) in a range more than Vel21 of a low speed and less than the vehicle speed Vel22 (>Vel12) of a high speed, and keeps a constant fcv22 in a range more than the vehicle speed Vel22 of the high vehicle speed. The cut-off frequencies fcv12 and fcv22 may take a value of zero.

Concerning to the vehicle speed Vel, the low vehicle speeds Vel11 and Vel21 are assumed for example as an around speed of 0 to 2 km/h corresponding to an annoying micro vibration of a floor or a handle which is vibrated by an electric power steering apparatus in a situation causing a creep phenomenon, a parking time or a garage parking as an extremely low speed less than 5 km/h or a stopping statement, furthermore as a slow speed within an around 30 km/h for a slow driving in a city area or a narrow road and so on. While high vehicle speeds Vel12 and Vel22 are assumed for example as an around driving speed of 50 to 80 km/h on a wide road or a major road, or as a driving speed 80 km/h or more on a speed way or an express way.

Although the filtering sections 113 and 114 which filtering-process the motor angular acceleration $\alpha$ depending on the motor angular velocity and the vehicle speed Vel are individually comprised of the steering torque for compensation generating section 115 and the current command value for compensation generating section 116, this reason is that the purpose to use the motor angular acceleration are different in the torque control section 31 and the current control section 35 and the characteristics of the motor angular acceleration required are different each other. That is, although the current control section 35 compensates the current command value to reduce the torque ripple or the floor vibration, the torque control section 31 removes the vibration component of the torque ripple and so on from the torque sensor value in order to extract only the steering information of a driver. Since the torque sensor value is detected through the column shaft, the reduction gears and the torsion bar, the frequency band of the vibration components included in the torque sensor value is low in comparison with the motor angular acceleration and a phase is delayed for an actual behavior. Thus, in case of using the value of the same characteristic as the motor angular acceleration to compensate the current command value, since the included frequency band and the phase do not coincide, the vibration component is not only efficiently removed but also a component causing vibration may be added. Therefore, it is possible to efficiently filtering-process by individually setting the cut-off frequencies. Also, it is desirable that the cut-off frequency of the motor angular acceleration to use for the torque control section 31 is set as a value equal to or less than that of the motor angular acceleration to use for the current control.

Furthermore, a characteristic of the cut-off frequency varying section 111A and 112A may be calculated by means of an arithmetical mean of a frequency obtained depending on the motor angular velocity $\omega$ and a frequency obtained depending on the vehicle speed Vel. Thus, with respect to the floor vibration and the micro vibration of a handle causing at the low vehicle speed, it is possible to efficiently enhance the suppressing effect of the vibration by setting a lower cut-off frequency than a cut-off frequency at the high vehicle speed. On the other hand, it is desired that the cut-off frequency is set as a higher cut-off frequency than that of the torque control section since even a slight phase-lag accompany with the filtering processing influences to the steering feeling at the high vehicle speed. Since a vibration causing troubles at the low vehicle speed is covered by road noises and so on, it is no problem that a high frequency is sets as cut-off frequency.

On the other hand, since the slight phase-lag influences to the steering feeling in case of a high speed steering in spite of the low vehicle speed as well as a high speed statement, the cut-off frequency is required to set as a high frequency in a high-speed steering. Thus, it is possible to effectively calculate the motor angular acceleration having the most suitable characteristic by means of the arithmetic mean with the steering speed i.e. the cut-off frequency set due to the motor angular velocity and the cut-off frequency set due to the vehicle speed irrespective of the steering state.

Figure 11:
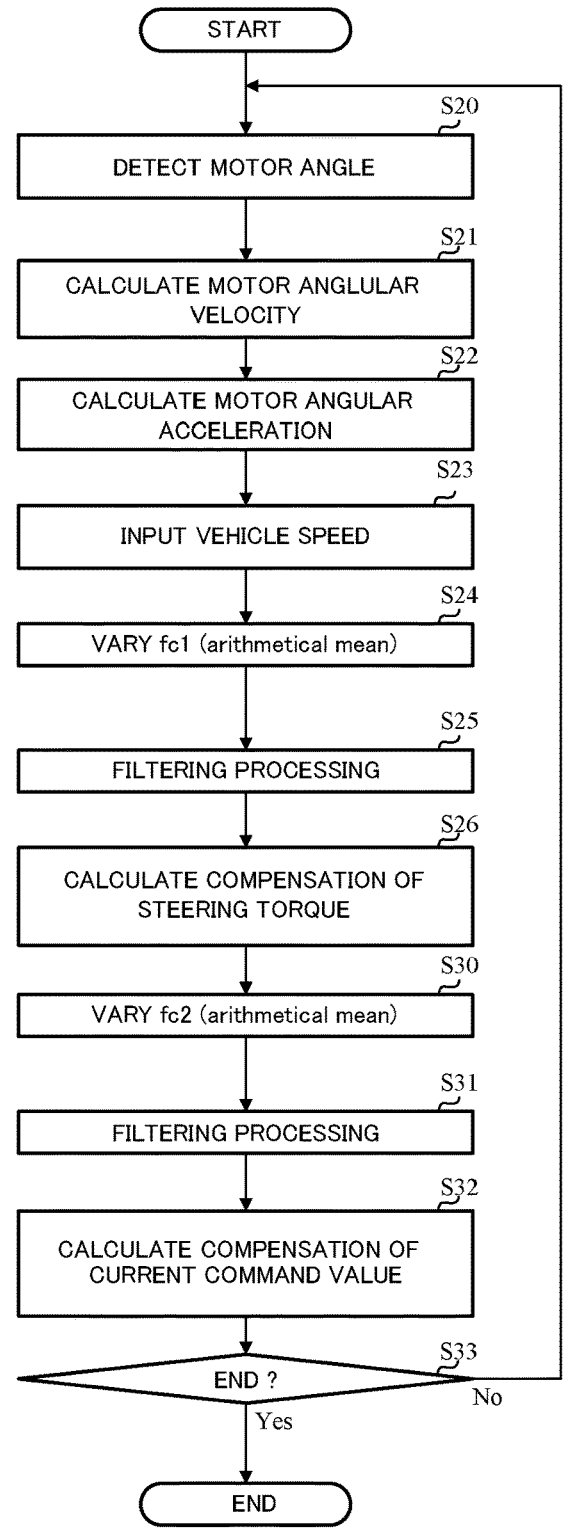
FIG. 11 is a flowchart showing an operation example (the second embodiment) of the present invention.

In such a configuration, an operation example (the second embodiment) of the present invention will be described with reference to a flowchart shown in FIG. 11.

First, the motor rotational angle $\theta$ is detected by the rotational angle sensor 21 (Step S20), the motor rotational angle $\theta$ is inputted into the motor angular velocity calculating section 100, and the motor angular velocity $\omega$ is calculated (Step S21). Then, the motor angular velocity $\omega$ is inputted into the motor angular acceleration calculating section 101, and the motor angular acceleration $\alpha$ is calculated (Step S22). Further, the vehicle speed Vel is inputted (Step S23). The motor angular velocity ω and the vehicle speed Vel are inputted into the cut-off frequency varying sections 111A and 112A within the stability compensating section 110A, and the motor angular acceleration α is inputted into the filtering sections 113 and 114 within the stability compensating section 110A. Further, an inputting order of the vehicle speed Vel is modifiable appropriately.

Further, the cut-off frequency varying section 111A varies the cut-off frequency fc1 by means of the arithmetical mean of the frequency obtained based on the motor angular velocity ω and the frequency obtained based on the vehicle speed Vel depending on the characteristics shown in FIG. 9 and FIG. 10 (Step S24). The set cut-off frequency fc1 is inputted into the filtering section 113, and the motor angular acceleration α is filtering-processed depending on the cut-off frequency fc1 in the filtering section 113 (Step S25). A signal which is filtering-processed in the filtering section 113 is inputted into the steering torque for compensation generating section 115, and the steering torque for compensation Tf which is signal-processed in the steering torque for compensation generating section 115 is inputted into the subtracting section 34A so as to compensate the steering torque Th (Step S26).

Thereafter, the cut-off frequency varying section 112A varies the cut-off frequency fc2 by means of the arithmetical mean of the frequency obtained based on the motor angular velocity ω and the frequency obtained based on the vehicle speed Vel depending on the characteristics shown in FIG. 9 and FIG. 10 (Step S30). The set cut-off frequency fc2 is inputted into the filtering section 114, and the motor angular acceleration α is filtering-processed in the filtering section 114 depending on the cut-off frequency fc2 (Step S31). A signal which is filtering-processed in the filtering section 114 is inputted into the current command value for compensation generating section 116, and the current command value for compensation If which is signal-processed in the current command value for compensation generating section 116 is inputted into the adding section 34B so as to compensate a current command Iref (Step S32).

Till a condition of the end is satisfied, the above operations are repeated (Step S33).

In this way, the cut-off frequencies fc1 and fc2 in the filtering sections 113 and 114 are varied depending on the motor angular velocity ω and the vehicle speed Vel so as to set the low cut-off frequency at the steering holding time and the low-speed steering time and the high cut-off frequency at the high-speed steering time. Therefore, it is possible to suppress a vibration (micro vibration at the steering holding) causing a trouble at a low frequency side without deteriorating a characteristic of a high frequency side. In other words, the performance of the compensating section improves by effectively removing superimposed noises in the motor angular acceleration α. Thus, the electric power steering apparatus having a comfortable steering feeling can be obtained.

Figure 12:
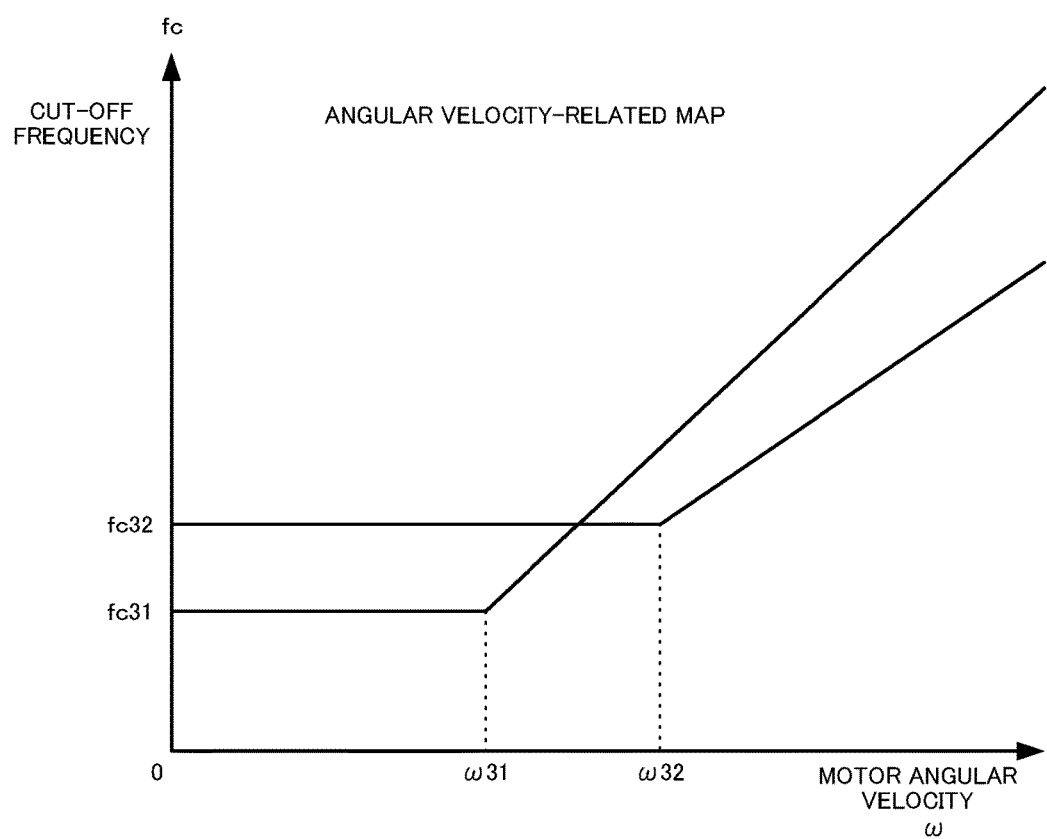
FIG. 12 is a characteristic diagram showing a characteristic example (a motor angular velocity) of a cut-off frequency of the third embodiment.
Figure 13:
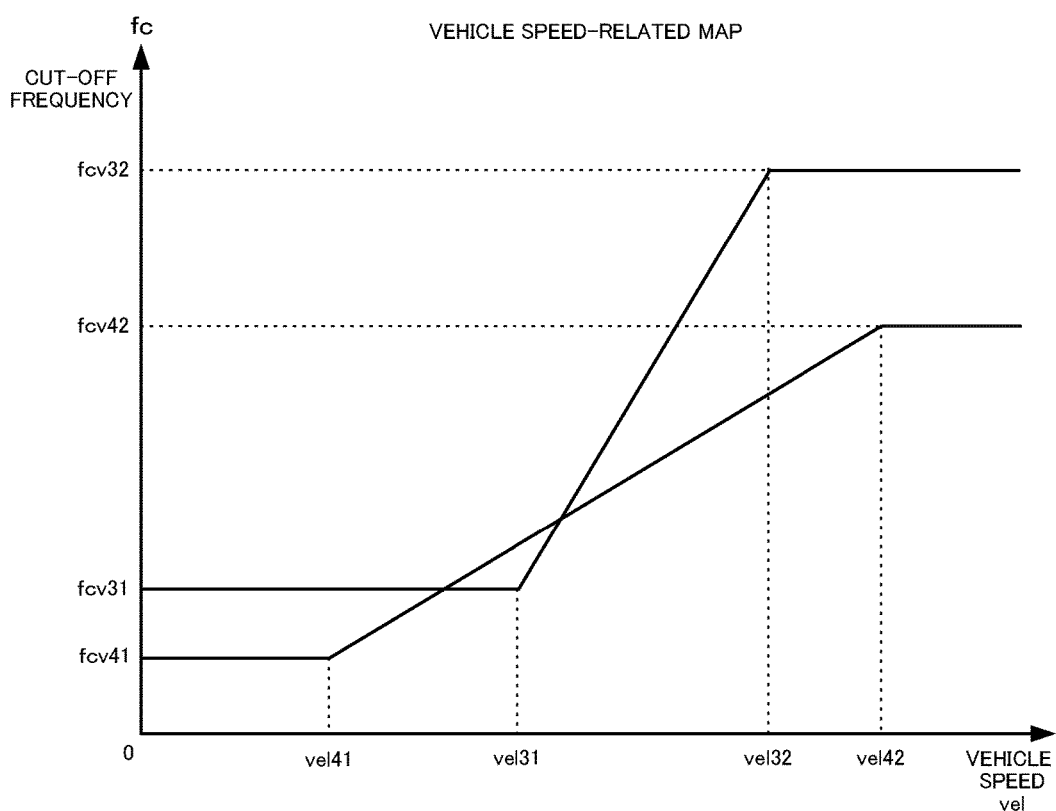
FIG. 13 is a characteristic diagram showing a characteristic example (a vehicle speed) of cut-off frequency of the third embodiment.

The cut-off frequency (fc) varying sections 111A and 112A may have characteristics shown in FIG. 12 or FIG. 13 (the third embodiment). A configuration of the third embodiment is similar to that of second embodiment as shown in FIG. 7 or FIG. 8. That is, as shown in FIG. 12, the cut-off frequency varying section 111A has a characteristic by which a cut-off frequency keeps a constant fc31 in a range equal to or less than a motor angular velocity ω31, and linearly increases in a range more than the motor angular velocity ω31. Similarly, as shown in FIG. 12, the cut-off frequency varying section 112A has a characteristic by which a cut-off frequency keeps a constant fc32 (>fc31) in a range equal to or less than a motor angular velocity ω32 (>ω31), and linearly increases in a range more than the motor angular velocity ω32.

Also, as shown in FIG. 13, the cut-off frequency varying section 111A has a characteristic by which a cut-off frequency keeps a constant fcv41 in a range equal to or less than a vehicle speed Vel41, and linearly or nonlinearly increases to a frequency fcv42 (>fcv41) in a range more than the vehicle speed Vel41 of a low speed and less than a vehicle speed Vel42 of a high speed, and keeps a constant fcv42 in a range more than the vehicle speed Vel42 of the high speed. Similarly, as shown in FIG. 13, the cut-off frequency varying section 112A has a characteristic by which a cut-off frequency keeps constant fcv31 (>fcv41) in a range equal to or less than a vehicle speed Vel31 (>Vel41), and linearly or nonlinearly increases to a frequency fcv32 (>fcv31) in a range more than the vehicle speed Vel31 of a low speed and less than a vehicle speed Vel32 of a high speed, and keeps a constant fcv32 in a range more than the vehicle speed Vel32 of the high speed. Cut-off frequencies fcv41 and fcv31 may take a value of zero.

Concerning to the vehicle speed Vel, the low vehicle speeds Vel41 and Vel31 are assumed for example as an around speed of 0 to 2 km/h corresponding to an annoying micro vibration of a floor or a handle which is vibrated by an electric power steering apparatus in a situation causing a creep phenomenon, a parking time or a garage parking as an extremely low speed less than 5 km/h or a stopping statement, furthermore as a slow speed within an around 30 km/h for a slow driving in a city area or a narrow road and so on. While high vehicle speeds Vel12 and Vel22 are assumed for example as an around driving speed of 50 to 80 km/h on a wide road or a major road, or as a driving speed 80 km/h or more on a speed way or an express way.

Also, since a slight phase-lag influences to the steering feeling as well as at a high vehicle speed state in a case the steering speed is high even at a slow vehicle speed, it is desired that the cut-off frequency is set to a higher cut-off frequency. When the motor angular velocity ω is high in a state that the vehicle speed Vel is low, i.e. in a case that the handle is quickly steered in a driving at a slow vehicle speed, it is possible to effectively remove the noises without deteriorating the steering feeling by setting weighting coefficients W1 and W2 so that W1 is dozen times of W2 as W1 is set to 10 and W2 is set to 1 and further by setting a higher cut-off frequency than that calculated based on a vehicle speed Vel. As stated above, the motor angular acceleration α having the most suitable characteristic irrespective of the steering state can be effectively calculated by means of a weighted average and a cut-off frequency set depending on the motor angular velocity ω and a cut-off frequency set depending on the vehicle speed Vel.

A vibration property and a steering performance are respectively different depending on some kinds of vehicles or conditions. Therefore, in order to adapt to changes of the characteristics due to dispersion of the complete vehicles, usage states of the vehicles, secular variation and so on, it is possible to more effectively and sensitively realize the vibration property and the steering performance by tuning the weighting coefficients W1 and W2 of the weighted average depending on conditions of the vehicles. For example, when the frequency of the floor vibration becomes higher due to the improvement or the like of the vehicle constituting members for the derived vehicles a base vehicle, it is possible to enhance a sensitivity for the motor angular velocity ω and to improve the steering performance by that the weighting coefficient W1 of the frequency calculated based on the motor angular velocity ω is greater than the weighting coefficient W2 of the frequency calculated based on the vehicle speed Vel. Furthermore, when one of the weighting coefficients is set to zero, only motor angular velocity ω or only the vehicle speed Vel is able to vary the cut-off frequency. Therefore, the different characteristic of the cut-off frequency in the filtering sections 113 and 114 is able to set adapting for an active characteristic of the vibration and a required steering performance of the vehicle.

Figure 14:
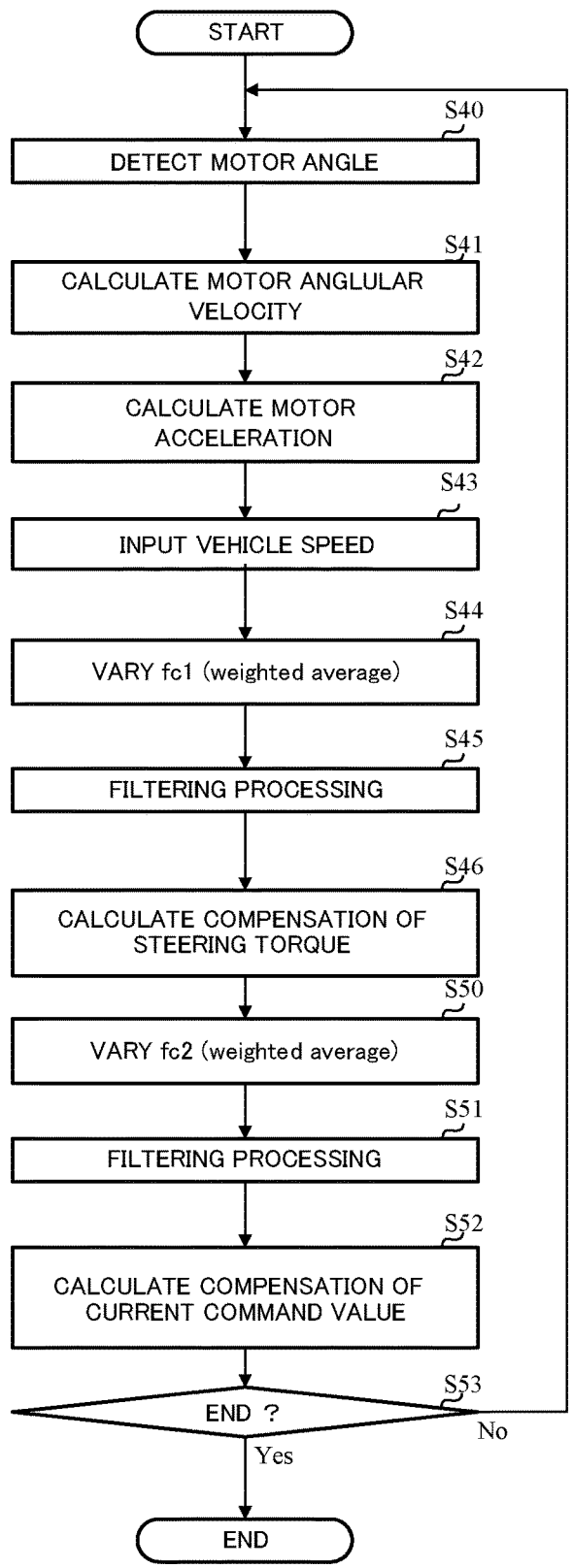
FIG. 14 is a flowchart showing an operation example (the third embodiment) of the present invention.

In such a configuration, an operation example (the third embodiment) of the present invention will be described with reference to a flowchart shown in FIG. 14.

First, the motor rotational angle θ is detected by the rotational angle sensor 21 (Step S40), the motor rotational angle θ is inputted into the motor angular velocity calculating section 100, and the motor angular velocity ω is calculated (Step S41). Then, the motor angular velocity ω is inputted into the motor angular acceleration calculating section 101, and the motor angular acceleration α is calculated (Step S42). Further, the vehicle speed Vel is inputted (Step S43). The motor angular velocity ω is inputted into the cut-off frequency varying sections 111A and 112A, the vehicle speed Vel is also inputted into the cut-off frequency varying sections 111A and 112A, and the motor angular acceleration α is inputted into the filtering sections 113 and 114.

Further, the cut-off frequency varying section 111A varies the cut-off frequency fc1 by means of the weighted average of the frequency obtained based on the motor angular velocity ω and the frequency obtained based on the vehicle speed Vel depending on the characteristics shown in FIG. 12 and FIG. 13 (Step S44). The set cut-off frequency fc1 is inputted into the filtering section 113, and the motor angular acceleration α is filtering-processed depending on the cut-off frequency fc1 in the filtering section 113 (Step S45). A signal which is filtering-processed in the filtering section 113 is inputted into the steering torque for compensation generating section 115, and the steering torque for compensation Tf which is signal-processed in the steering torque for compensation generating section 115 is inputted into the subtracting section 34A so as to compensate the steering torque Th (Step S46).

Thereafter, the cut-off frequency varying section 112A varies the cut-off frequency fc2 by means of the weighted average of the frequency obtained based on the motor angular velocity ω and the frequency obtained based on the vehicle speed Vel depending on the characteristics shown in FIG. 12 and FIG. 13 (Step S50). The set cut-off frequency fc2 is inputted into the filtering section 114, and the motor angular acceleration α is filtering-processed in the filtering section 114 depending on the cut-off frequency fc2 (Step S51). A signal which is filtering-processed in the filtering section 114 is inputted into the current command value for compensation generating section 116, and the current command value for compensation If which is signal-processed in the current command value for compensation generating section 116 is inputted into the adding section 34B so as to compensate a current command Iref (Step S52).

Till a condition of the end is satisfied, the above operations are repeated (Step S53).

In this way, the cut-off frequencies fc1 and fc2 in the filtering sections 113 and 114 are varied depending on the motor angular velocity ω and the vehicle speed Vel so as to set the low cut-off frequency at the steering holding time and the low-speed steering time and the high cut-off frequency at the high-speed steering time. Therefore, it is possible to suppress a vibration (micro vibration at the steering holding) causing a trouble at a low frequency side without deteriorating a characteristic of a high frequency side. In other words, the performance of the compensating section improves by effectively removing superimposed noises in the motor angular acceleration α. Thus, the electric power steering apparatus having a comfortable steering feeling can be obtained.

Figure 15:
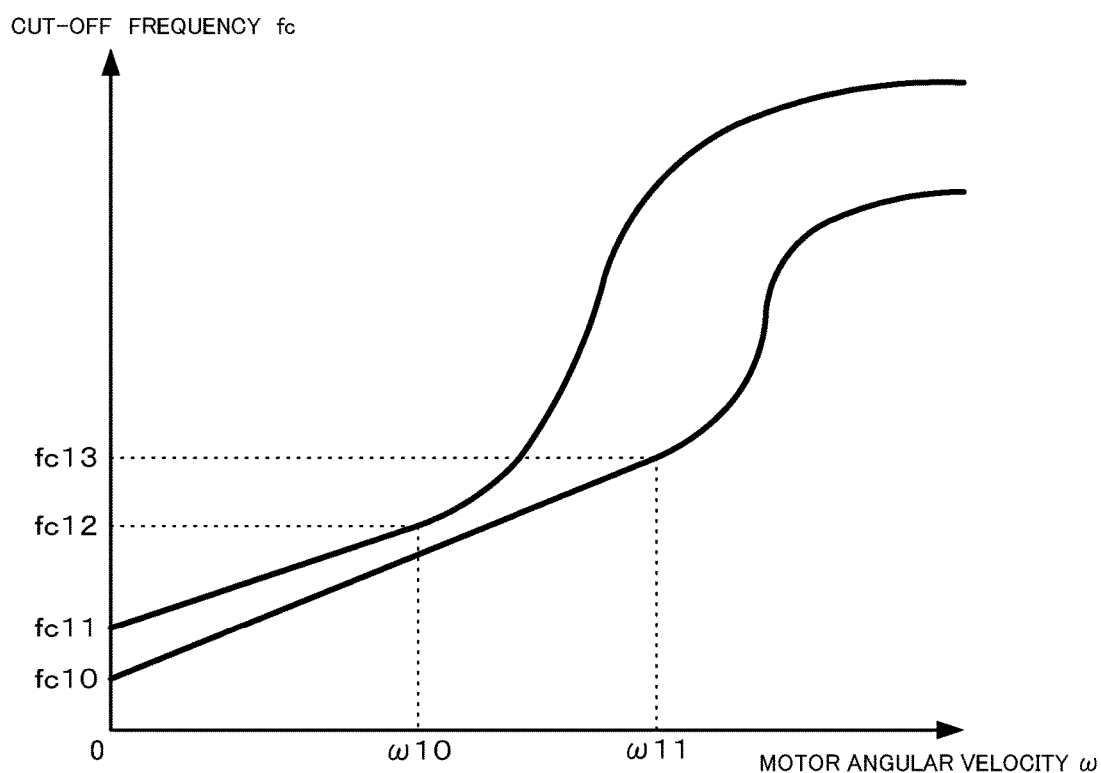
FIG. 15 is a characteristic diagram showing another characteristic example of cut-off frequency (a motor angular velocity).

In the above mentions, the cut-off frequency varying sections 111, 112, 111A and 112A have completely linear characteristic, however the cut-off frequency fc1 or fc2 linearly increases in a range to the motor angular velocity ω10 or ω11 each as shown in FIG. 15, and a characteristic of the cut-off frequency fc may non-linearly increase in a range larger than the motor angular velocity ω10 or ω11. Also, a characteristic of the cut-off frequency fc1 non-linearly increase in a range to the motor angular velocity ω10 or ω11, and a characteristic of the cut-off frequency fc may linearly increase in a range wider than the motor angular velocity ω10 or ω11.

Further, although the motor angle is acquired by a rotational angle sensor as a resolver and so on connected to the motor in the above mentions, it may be obtained from a steering angle sensor.

EXPLANATION OF REFERENCE NUMERALS 1 steering wheel
2 column shaft (steering shaft, handle shaft)
10 torque sensor
12 vehicle speed sensor
13 battery
20 motor
21 rotational angle sensor
30 control unit (ECU)
31 torque control section
35 current control section
100 motor angular velocity calculating section
101 motor angular acceleration calculating section
110, 110A stability compensating section
111, 111A, 112, 112A cut-off frequency (fc) varying section
113, 114 filtering section
115 steering torque for compensation generating section
116 current command value for compensation generating section

The invention claimed is:

1. An electric power steering apparatus that has a torque control section to calculate a current command value based on at least a steering torque, and assist-controls a steering system by driving a motor by means of a current control system based on said current command value, comprising:
a motor angular velocity calculating section to calculate a motor angular velocity ω from a motor rotational angle,
a motor angular acceleration calculating section to calculate a motor angular acceleration α from said motor angular velocity ω, and
a stability compensating section to calculate a steering torque for compensation and a current command value for compensation based on said motor angular velocity ω and said motor angular acceleration α,
wherein said stability compensating section comprises a first cut-off frequency varying section to set a cut-off frequency fc1 based on said motor angular velocity ω, a first filtering section to filtering-process said motor angular acceleration α depending on said cut-off frequency fc1, a second cut-off frequency varying section to set a cut-off frequency fc2 based on said motor angular velocity ω, and a second filtering section to filtering-process said motor angular acceleration α depending on said cut-off frequency fc2,
wherein said steering torque for compensation compensates said steering torque, and said current command value for compensation compensates said current command value.

2. The electric power steering apparatus according to claim 1, wherein
said first cut-off frequency varying section has a cut-off frequency characteristic by which said first cut-off frequency fc1 keeps a constant in a range equal to or less than a motor angular velocity ω1, and linearly or nonlinearly increases in a range more than said motor angular velocity ω1, and
said second cut-off frequency varying section a cut-off frequency characteristic by which said second cut-off frequency fc2 keeps a constant in a range equal to or less than a motor angular velocity ω2 (>ω1), and linearly or nonlinearly increases in a range more than said motor angular velocity ω2.

3. The electric power steering apparatus according to claim 1, wherein
said first cut-off frequency varying section has a cut-off frequency characteristic, by which said first cut-off frequency fc1 linearly increases in a range equal to or less than a motor angular velocity ω10, and linearly or nonlinearly becomes high in a range more than said motor angular velocity ω10, and
said second cut-off frequency varying section has a cut-off frequency characteristic, by which said second cut-off frequency fc2 linearly increases in a range equal to or less than a motor angular velocity ω11 (>ω10), and linearly or nonlinearly becomes high in a range more than said motor angular velocity ω11.

4. The electric power steering apparatus according to claim 1, wherein
a vehicle speed Vel is further used for calculations of said steering torque for compensation and said current command value for compensation, and said motor angular velocity ω and said vehicle speed Vel are respectively used for settings of said cut-off frequency fc1 and said cut-off frequency fc2.

5. The electric power steering apparatus according to claim 4, wherein
said first cut-off frequency varying section calculates and obtains said cut-off frequency fc1, which is calculated with an arithmetical mean of a frequency fc11 which is calculated by means of an angular velocity-related map that indicates a relation between said motor angular velocity ω and a frequency and a frequency fcv11 which is calculated by means of a vehicle speed-related map that indicates a relation between said vehicle speed Vel and a frequency, and
said second cut-off frequency varying section calculates and obtains said cut-off frequency fc2, which is calculated with an arithmetical mean of a frequency fc21 which is calculated by means of an angular velocity-related map that indicates a relation between said motor angular velocity ω and a frequency and a frequency fcv21 which is calculated by means of a vehicle speed-related map that indicates a relation between said vehicle speed Vel and a frequency.

6. The electric power steering apparatus according to claim 5, wherein
said angular velocity-related map of said first cut-off frequency varying section has a characteristic by which said first cut-off frequency fc1 keeps a constant in a range equal to or less than a motor angular velocity ω21, and linearly or nonlinearly becomes high in a range more than said motor angular velocity ω21, and
said angular velocity-related map of said second cut-off frequency varying section has a characteristic by which said second cut-off frequency fc21 keeps a constant in a range equal to or less than a motor angular velocity ω22 (>ω21), and linearly or nonlinearly becomes high in a range more than said motor angular velocity ω22.

7. The electric power steering apparatus according to claim 5, wherein
said angular velocity-related map of said first cut-off frequency varying section has a cut-off frequency characteristic, by which said frequency fc11 linearly increases in a range equal to or less than a motor angular velocity ω21, and linearly or nonlinearly becomes high in a range more than said motor angular velocity ω21, and
said angular velocity-related map of said second cut-off frequency varying section has a cut-off frequency characteristic, by which said frequency fc21 linearly increases in a range equal to or less than a motor angular velocity ω22 (>ω21), and linearly or nonlinearly becomes high in a range more than said motor angular velocity ω22.

8. The electric power steering apparatus according to claim 6, wherein
said vehicle speed-related map of said first cut-off frequency varying section has a frequency characteristic that keeps a constant fcv11 in a range equal to or less than a low vehicle speed Vel11 of said vehicle speed Vel, linearly or nonlinearly decreases to a frequency fcv12 (<fcv11) in a range more than said low vehicle speed Vel11 and equal to or less than a high vehicle speed Vel12, and keeps said frequency fcv12 in a ranges more than said high vehicle speed Vel12, and
said vehicle speed-related map of said second cut-off frequency varying section has a characteristic that keeps a constant fcv21 in a range equal to or less than a low vehicle speed Vel21 of said vehicle speed Vel, linearly or nonlinearly decreases to a frequency fcv22 (<fcv21) in a range more than said low vehicle speed Vel21 and equal to or less than a high vehicle speed Vel22, and keeps said frequency fcv22 in a range more than said high vehicle speed Vel22.

9. The electric power steering apparatus according to claim 7, wherein
said vehicle speed-related map of said first cut-off frequency varying section has a frequency characteristic that keeps a constant fcv11 in a range equal to or less than a low vehicle speed Vel11 of said vehicle speed Vel, linearly or nonlinearly decreases to a frequency fcv12 (<fcv11) in a range more than said low vehicle speed Vel11 and equal to or less than a high vehicle speed Vel12, and keeps said frequency fcv12 in a ranges more than said high vehicle speed Vel12, and
said vehicle speed-related map of said second cut-off frequency varying section has a characteristic that keeps a constant fcv21 in a range equal to or less than a low vehicle speed Vel21 of said vehicle speed Vel, linearly or nonlinearly decreases to a frequency fcv22 (<fcv21) in a range more than said low vehicle speed Vel21 and equal to or less than a high vehicle speed Vel22, and keeps said frequency fcv22 in a range more than said high vehicle speed Vel22.

10. The electric power steering apparatus according to claim 4, wherein said first cut-off frequency varying section calculates and obtains said cut-off frequency fc1, which is calculated with a weighted average of a frequency fc31 which is calculated by means of an angular velocity-related map that indicates a relation between said motor angular velocity ω and a frequency and a frequency fcv11 which is calculated by means of a vehicle speed-related map that indicates a relation between said vehicle speed Vel and a frequency, and said second cut-off frequency varying section calculates and obtains said cut-off frequency fc2, which is calculated with a weighted average of a frequency fc32 which is calculated by means of an angular velocity-related map that indicates a relation between said motor angular velocity ω and a frequency and a frequency fcv21 which is calculated by means of a vehicle speed-related map that indicates a relation between said vehicle speed Vel and a frequency.

11. The electric power steering apparatus according to claim 10, wherein, said angular velocity-related map of said first cut-off frequency varying section has a characteristic by which said frequency fc31 keeps a constant in a range equal to or less than a motor angular frequency ω31, and linearly or nonlinearly becomes high in a range more than said motor angular velocity ω31, and said angular velocity-related map of said second cut-off frequency varying section has a characteristic by which said frequency fc32 keeps a constant in a range equal to or less than a motor angular velocity ω32 (>ω31), and linearly or nonlinearly becomes high in a range more than said motor angular velocity ω32.

12. The electric power steering apparatus according to claim 10, wherein said angular velocity-related map of said first cut-off frequency varying section has a cut-off frequency characteristic, by which said frequency fc31 linearly increases in a range equal to or less than said motor angular velocity ω31, and linearly or nonlinearly becomes high in a range more than said motor angular velocity ω31, and said angular velocity-related map of said second cut-off frequency varying section has a cut-off frequency characteristic, by which said frequency fc32 linearly increases in a range equal to or less than said motor angular velocity ω32 (>ω31), and linearly or nonlinearly becomes high in a range more than said motor angular velocity ω32.

13. The electric power steering apparatus according to claim 11, wherein said vehicle speed-related map of said first cut-off frequency varying section has a frequency characteristic that keeps a constant fcv31 in a range equal to or less than a low vehicle speed Vel31 of said vehicle speed Vel, and linearly or nonlinearly increases to a frequency fcv32 (>fcv31) in a range more than said low vehicle speed Vel31 and equal to or less than a high vehicle speed Vel32, and keeps said frequency fcv32 in a range more than said high vehicle speed Vel32, and said vehicle speed-related map of said second cut-off frequency varying section has a characteristic that keeps a constant fcv41 in a range equal to or less than a low vehicle speed Vel41 of said vehicle speed Vel, and linearly or nonlinearly increases to a frequency fcv42 (>fcv41) in a range more than said low vehicle speed Vel41 and equal to or less than a high vehicle speed Vel42, and keeps said frequency fcv42 in a range more than said high vehicle speed Vel42.

14. The electric power steering apparatus according to claim 12, wherein said vehicle speed-related map of said first cut-off frequency varying section has a frequency characteristic that keeps a constant fcv31 in a range equal to or less than a low vehicle speed Vel31 of said vehicle speed Vel, and linearly or nonlinearly increases to a frequency fcv32 (>fcv31) in a range more than said low vehicle speed Vel31 and equal to or less than a high vehicle speed Vel32, and keeps said frequency fcv32 in a range more than said high vehicle speed Vel32, and said vehicle speed-related map of said second cut-off frequency varying section has a characteristic that keeps a constant fcv41 in a range equal to or less than a low vehicle speed Vel41 of said vehicle speed Vel, and linearly or nonlinearly increases to a frequency fcv42 (>fcv41) in a range more than said low vehicle speed Vel41 and equal to or less than a high vehicle speed Vel42, and keeps said frequency fcv42 in a range more than said high vehicle speed Vel42.

15. A control unit of the electric power steering control apparatus according to claim 1, wherein said motor angular velocity ω is calculated from a steering angle sensor.

* * * * *